May 13, 1969  R. W. LANMAN  3,443,486

PISTON AND SEAL ASSEMBLY

Filed Aug. 7, 1967

INVENTOR.
ROBERT W. LANMAN
BY
John N. Wolfram
ATTORNEY

United States Patent Office 3,443,486
Patented May 13, 1969

3,443,486
PISTON AND SEAL ASSEMBLY
Robert W. Lanman, Homeworth, Ohio, assignor to Parker-Hannifin Corporation, Cleveland, Ohio, a corporation of Ohio
Filed Aug. 7, 1967, Ser. No. 658,864
Int. Cl. F16j 9/08
U.S. Cl. 92—244                    4 Claims

ABSTRACT OF THE DISCLOSURE

A piston seal arrangement in which the piston head has a flange at one end for retaining bearing and packing members and has grooves for receiving a split separator annulus and a split combination bearing and retaining member whereby all the bearing and packing members may be removed from the piston head without completely removing the piston from the cylinder, the bearing and packing parts being of materials and so arranged that no metal parts contact the cylinder wall.

---

This invention is particularly applicable to pistons for hydraulic cylinders but may be used to advantage in other devices, as for example, hydraulic accumulators. The main cause of malfunctioning of heavy duty hydraulic cylinders is leakage of hydraulic fluid past the piston. One cause of such leakage is scoring of the cylinder wall, either by contact therewith of metal piston parts or by particles of metal contaminant within the cylinder. Another cause is damage to the packing by extrusion of the same into clearance spaces between the piston and the cylinder wall.

The present invention eliminates or minimizes leakage from these causes by providing plastic parts on the piston for contact with the cylinder bore and for permitting embedment of metal particles therein so that they will not cause scoring of the cylinder wall by becoming jammed between the cylinder wall and metal parts of the piston. The invention further permits replacement of the piston packing and bearing members without complete disassembly of the piston from the cylinder, thus minimizing down time of the cylinder for packing replacement.

Figure 1:
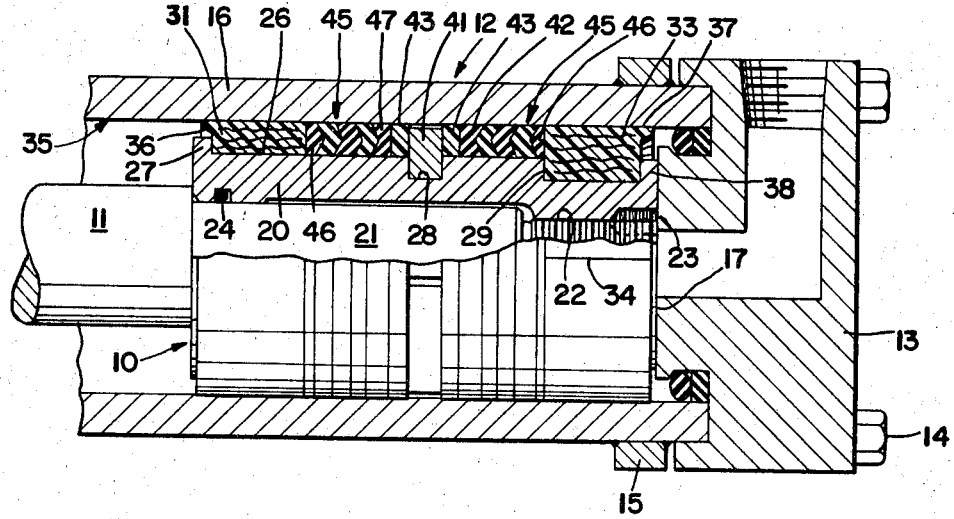
Figure 2:
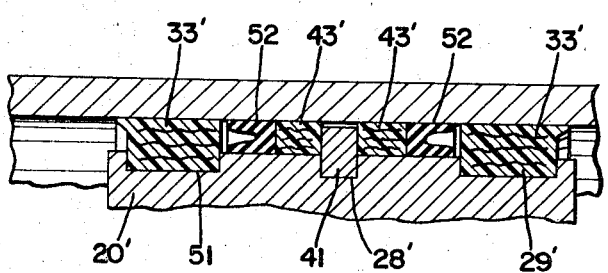

The construction, operation and advantages of the invention will be apparent from the following detailed description and from the drawings, in which:

FIGURE 1 is a cross section of one end of a cylinder with portions of the piston broken away, and FIGURE 2 is a fragmentary section view of another form of the invention.

In the form of FIGURE 1, piston head assembly 10 is shown mounted upon a piston rod 11 that is at one end of its stroke within a cylinder 12 that is closed at one end by an end cap 13 held in place by bolts 14 threaded into a collar 15 that is welded onto a steel cylinder tube 16. End cap 13 has a face 17 that may serve as a stop for travel of the piston. Piston 10 includes a hollow piston head 20 preferably of mild steel telescoped over a reduced diameter shank 21 of piston rod 11 and attached thereto by means of a threaded connection 22. A set screw 23 prevents inadvertent unthreading of piston head 20 from the rod and a packing ring 24 seals against leakage of fluid through the hollow portion of the piston head.

The piston head 20 has a cylindrical outer surface 26 terminating at one end in an outwardly projecting radial flange 27 and having a first annular groove 28 therein intermediate its ends and a second annular groove 29 near its other end.

A first circumferentially continuous bearing ring 31 has a close fit on surface 26 and abuts flange 27. A second bearing ring 33 that is actually split as at 34 in two places 180° apart is mounted within groove 29. Both bearing rings 31, 33 have substantially the same outside diameter that is a close sliding fit with bore wall 35 of cylinder tube 16. Each bearing ring has an axially extending lip 36, 37 that is just short of the adjacent end of piston head 20 and whose inner faces are at an angle of about 45 degrees with the outer circumferential surface and meet the same at substantially a sharp edge. Lips 36, 37 are radially spaced from the outer surfaces of flanges 27, 38 to provide annular spaces therebetween for receiving foreign matter scraped from the cylinder bore wall 35 by lips 36, 37.

Bearing rings 31, 33 are made of a phenolic resin and preferably with a wrapped fabric of linen, cotton or the like embedded therein. This material is rigid enough to provide good bearing support for the piston head but is yet soft enough so that particles of metal or other foreign matter will become embedded therein when caught between the bearings and the cylinder bore and thus avoid scoring of the cylinder bore. An example of a suitable material is one in accordance with either specifications ASTM D–709 type II or MIL–P–15035.

Mounted in first groove 28 is a separator annulus 41 of bronze or other bearing metal, or of phenolic resin or other plastic, that will avoid galling if it comes in sliding contact with cylinder tube 16. The outer diameter of annulus 41 is slightly smaller than the outer diameters of bearing rings 31, 33 so as to have a radial clearance on the order of .010″ with bore wall 35.

On either side of separator annulus 41 are backup rings 43 of the same material as rings 31, 33 and like the latter has a relatively soft modulus of elasticity in the neighborhood of 1 million p.s.i., as compared with a modulus of elasticity for steel or iron of 30 million p.s.i. The inner diameters of rings 43 have a close sliding fit on surface 26.

Between backup rings 43 and bearing rings 31, 33 are identical V ring packing sets generally designated 45 and comprising a series of V cups and end adapters 46, 47, all of synthetic rubber or other elastomeric material suitable for the fluid to be introduced in the cylinder.

Adapters 47 receive the full thrust of the fluid under pressure acting on the respective end of piston head 20 and are pressed thereby against the adjacent backup ring 43. Because of the relatively low modulus of elasticity of the latter, they will be deformed to take up the slight clearance between their outer diameters and cylinder bore 35 and between their inner diameters and surface 26 so as to prevent extrusion of material from adapters 47 at these locations. In turn, the radial clearance space between separator annulus 41 and cylinder bore 35, which is on the order of .010″, is sufficient to prevent extrusion of backup rings 43 thereinto.

The piston head and sealing arrangement shown permit the replacement of the packing set or any of its components without completely disassembling the cylinder. Thus, it is necessary only to remove the blind end cap 13, that is, the one through which piston rod 11 does not project, and move piston head 20 out of bore 35. Split bearing ring 33 and split annulus 41 may then be removed radially from their grooves and the remaining parts of the packing set may be removed endwise from piston 20 toward the outer end of the latter and then reassembled in the reverse manner with the new components. Furthermore, this procedure does not require removal of piston head 20 from rod 11.

In the FIGURE 2 form, piston head 20 differs from that in FIGURE 1 in that an additional groove 51 is adjacent one and an axially split bearing ring 33′ identical to ring 33 is located therein. Also, all portions of outer surface 26 are the same diameter, except for grooves 51, 28' and 29'. Also, in this case the deformable packing rings 52 may be U-cups, although other shapes such as O-rings will also suffice. Between the U-cups and separator annulus 41' are phenolic backup rings 43'.

In this form both bearing rings 31' are anchored by the respective grooves 51, 29' against axial displacement on the piston head.

Another advantage of the general design is that it readily permits the use of pistons 20 of varying lengths with the same packing elements other than bearings 31, 33, or 33'. For long stroke cylinders it is desirable to use piston heads 20 of greater length than short stroke cylinders to more adequately support rod 11 against side loads and deflection from its own weight. For long stroke cylinders piston head 20 may be lengthened as desired and bearings 31, 33, or 33' as the case may be, also lengthened accordingly while the remaining parts of the packing set remain the same as for short stroke cylinders. Also, because piston head 20 at no time contacts cylinder wall 35 it need not be made of expensive bronze or other bearing metal but may be made of relatively inexpensive mild steel.

I claim:

1. A piston seal assembly comprising a piston head having an outer circumferential surface, means at one end of the surface for retaining a first bearing ring of rigid solely nonmetallic material upon the piston head, a first groove between the ends of the surface and a second groove near the other end of the surface, a second bearing ring solely of rigid nonmetallic material in the second groove and projecting therefrom, a rigid separator annulus within the first groove and projecting therefrom, said annulus and said second bearing ring being axially split so as to be radially removable from said head, first deformable packing means between the first bearing ring and the separator annulus, and a second deformable packing means between the separator annulus and the second bearing ring and immediately adjacent the latter.

2. The assembly of claim 1 in which said first mentioned means comprises a third groove in which said bearing ring is located and said first bearing ring is axially split and is immediately adjacent said first deformable packing means.

3. The assembly of claim 1 in which said surface is of the same diameter throughout its length except for said grooves and in which one of said bearing rings has an axially extending scraper lip at its outer end and therebeing an annular clearance between the full length of said lip and the piston head for receiving foreign matter scraped up by said lip.

4. A piston and seal assembly comprising a piston head having an outer circumferential surface terminating at one of its ends in a radially projecting first flange of greater diameter than said surface, a first groove between the ends of the surface and second groove near the other end of the surface and providing a second flange at said other end that is integral with the piston head and of a diameter no larger than the diameter of said surface, said grooves having a diameter less than the diameter of said surfaces, first and second bearing rings of rigid nonmetallic material, the first ring being on said surface against said first flange and the second ring being in the second groove and projecting therefrom, a rigid separator annulus within the first groove and projecting therefrom, said annulus and said second bearing ring being axially split so as to be radially removable from said head, first deformable packing means between the first bearing ring and the separator annulus, and a second deformable packing means between the separator annulus and the second bearing ring, said first and second packing means having an inside diameter the same as the diameter of said surface and being in sealing contact therewith, said first ring and said packing means being axially removable from said other end of said surface over said second flange when said annulus and second bearing ring are removed.

References Cited

UNITED STATES PATENTS

| | | | |
|---|---|---|---|
| 2,216,353 | 10/1940 | Park | 92—254 X |
| 2,349,253 | 5/1944 | Edmund | 92—258 X |
| 3,053,596 | 9/1962 | Farmer et al. | 92—252 X |
| 3,066,001 | 11/1962 | Zimmerman | 92—252 |
| 3,115,071 | 12/1963 | Strader | 92—252 X |
| 3,155,014 | 11/1964 | Genz | 92—254 X |
| 3,165,032 | 1/1965 | Konkle | 92—252 |
| 3,187,645 | 6/1965 | Cope | 92—258 |
| 3,314,683 | 4/1967 | Schmidt et al. | 92—250 X |
| 3,312,150 | 4/1967 | Strader | 92—252 |
| 3,266,810 | 8/1966 | Reeser | 277—24 |

FOREIGN PATENTS 819,605  11/1951  Germany.

CARROLL B. DORITY, JR., *Primary Examiner.*

U.S. Cl. X.R.

92—252, 253